United States Patent [19]

Danielsen et al.

[11] Patent Number: 5,136,704
[45] Date of Patent: Aug. 4, 1992

[54] REDUNDANT MICROPROCESSOR CONTROL SYSTEM USING LOCKS AND KEYS

[75] Inventors: Carl M. Danielsen, Lake Zurich; Ezzat A. Dabbish, Buffalo Grove; Larry C. Puhl, Sleepy Hollow, all of Ill.

[73] Assignee: Motorola, Inc., Schaumburg, Ill.

[21] Appl. No.: 372,746

[22] Filed: Jun. 28, 1989

[51] Int. Cl.⁵ .................. G06F 11/20; G06F 11/30
[52] U.S. Cl. .............................. 395/575; 364/DIG. 1; 364/267.9; 364/268.1; 371/9.1; 371/16.3; 371/68.3
[58] Field of Search .............. 371/3, 7, 8.1, 9.1, 371/11.1, 11.3, 14, 15.1, 16.1, 16.3, 62, 67.1, 68.1, 68.3, 23; 364/268.1, 267.9; 395/575

[56] References Cited

U.S. PATENT DOCUMENTS 4,649,537 3/1987 Rosswurm et al. .............. 371/16.1
4,916,704 4/1990 Bruckert et al. .................. 371/68.3

OTHER PUBLICATIONS

Iyengar, V. et al., "Concurrent Fault Detection in Microprogrammed Control Units", *IEEE Trans. on Computers*, vol. C-34, No. 9, Sep. 1985, pp. 810-821.

Kirrman, H., "Fault Tolerance in Process Control", *IEEE Micro*, Oct. 1987, pp. 27-50.

Ciminiera, L. et al., *Advanced Microprocessor Architectures*, copyright 1987 Addison-Wesley Publishers Ltd., pp. 84-88.

Brumm, D. et al., *80386 A Programming and Design Handbook*, 1987, TAB Books Inc., pp. 28-42.

"The Theory and Practice of Reliable System Design" by Siewiorek and Swarz, Digital Press, 1982. pp. 141-145.

*Primary Examiner*—Stephen M. Baker
*Attorney, Agent, or Firm*—John H. Moore

[57] ABSTRACT

A redundant processing system includes a pair of processors, each processor having an error detector, a key generator, and a lock circuit. The error detectors sense the outputs generated by their processors and generate an error signal when defective data is sensed. The key generators develop multi-bit codes of known patterns that are disrupted in response to receipt of an error signal from an error detector. The codes generated by the key generators are supplied to lock circuits which produce the same known multi-bit codes, and which compare their own codes to the codes supplied by the key generators. If a mis-match is detected, it will be due to a disrupted code that resulted from an error signal. Data from the processor associated with the error signal is rejected.

3 Claims, 5 Drawing Sheets

REDUNDANT MICROPROCESSOR CONTROL SYSTEM USING LOCKS AND KEYS

FIELD OF THE INVENTION

This invention is directed to redundant microprocessor controllers such as are used to control the operation of anti-lock braking systems (ABS) and other systems where safety and reliability are key concerns.

BACKGROUND OF THE INVENTION

Figure 1:
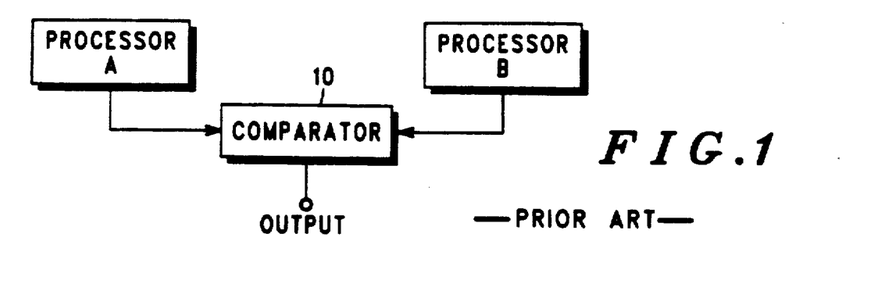
FIG. 1, previously described, illustrates a conventional control system using redundant microprocessors.

A typical microprocessor controller, such as is used in anti-lock braking systems, includes two microprocessor configured as shown in FIG. 1. Microprocessors A and B simultaneously execute ABS algorithms in response to inputs from wheel sensors (not shown) for generating outputs needed to activate a vehicle's brakes. A comparator 10 checks for identity between the two microprocessor outputs, and if identity is detected, the comparator sends one of the microprocessor's outputs to the brake system. When the comparator finds a lack of identity, a fault is assumed to have occurred, the controller is shut down, and the normal (non-ABS) braking system is put into effect.

The above-described type of controller suffers from the fact that a fault in either of the microprocessors causes the entire ABS system to shut down. From this point of view, the long term reliability of such a system is less than what is desirable.

To increase reliability, the controller can be made reconfigurable, meaning that a component that is detected as being faulty can be removed from the system. In a dual microprocessor system, the faulty microprocessor would be removed from the system and the good microprocessor would continue to run. The problem with this approach is that after the faulty microprocessor has been removed, there is nothing left against which to check the output of the good microprocessor, so system safety is lowered.

To improve the safety of this type of system, a triple redundant system (using three microprocessors) can be used. When a fault occurs in the triple redundant system, the faulty microprocessor is switched out of the system based on a majority vote. This system then becomes a dual redundant system of the type discussed above. When a second failure occurs, the system shuts down.

Common concerns with all approaches to redundant microprocessor controllers are safety and reliability. The approaches discussed above are considered safe insofar as they are able to detect a faulty controller and switch it off. To increase safety, the systems may add additional redundancy or other additional checking circuits that add complexity. This additional complexity can, of course, lead to less reliability insofar as there are more components capable of failing. It can therefore be seen that a new and different approach to improved reliability, while maintaining a high level of safety, is desirable.

OBJECTS OF THE INVENTION

It is a general object of the invention to provide a microprocessor system, and a method for preventing use of data from a defective processor, that overcomes the above-noted deficiencies of conventional controllers.

It is a more specific object of the invention to provide a redundant microprocessor system and method that features a high level of safety with improved reliability.

Another object of the invention is to provide such a redundant microprocessor system that is well suited for use in ABS systems.

DESCRIPTION OF THE PREFERRED EMBODIMENT

The description which follows is directed toward a microprocessor system, and a method useful therewith, for prohibiting the use of data generated by a defective processor. The preferred embodiment of that system and method are illustrated in hardware form. It should be understood, however, that much of the illustrated hardware may be replaced by software that carries out the same functions as the illustrated hardware.

Figure 2:
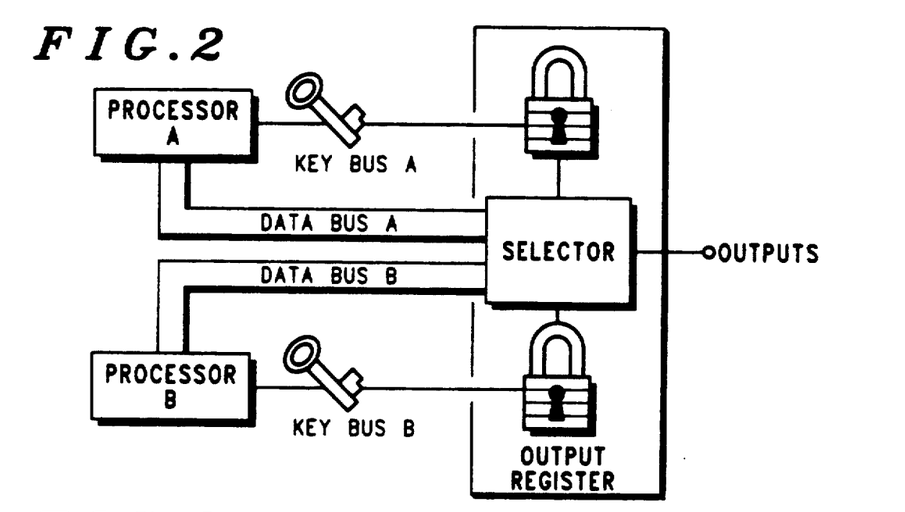
FIG. 2 is a very general schematic diagram of a control system that illustrates various aspects of the invention.

Referring now to FIG. 2, a very simplified block diagram illustrates a basic concept used by the present invention. What is shown is part of a redundant microprocessor (processor) controller that uses a lock and key system to determine, with a high level of confidence, whether processor A or processor B, or both of them, are operating properly. In the illustrated system, a processor cannot cause an action (e.g. such as writing to an output register) until it has provided proof of its correct operability to the outside world (e.g. to the output register). The proof that a processor is operating properly is provided by a key that is generated by the processor or by circuitry and/or software associated with the processor. The key can only be correct if the processor is performing correctly. In the illustrated system, the key is generated by the processor and a corresponding lock exists in output hardware which is illustrated as an output register. The lock determines whether the key is correct and allows an action to occur if it is correct.

In the illustrated arrangement, processors A and B normally run the same program, generate identical output data, and write outputs at the same time. If one processor should become defective, it would not be able to generate a correct key to fit its lock in the output register. This would cause the lock to remain closed and prohibit the output data from the defective processor from being written to the output register.

Figure 3:
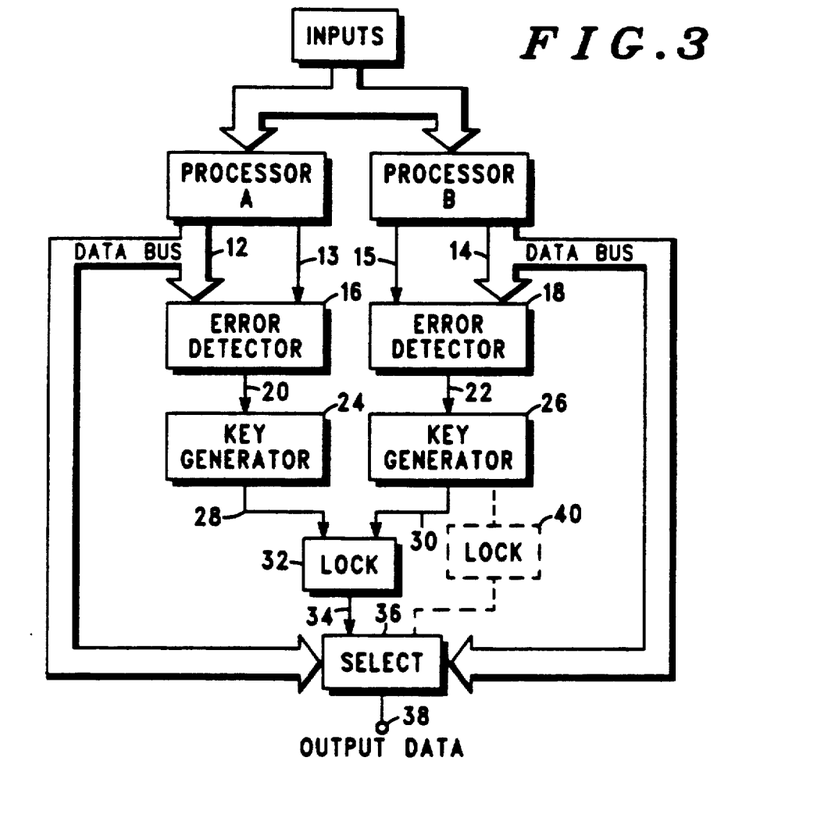
FIG. 3 is a block diagram of a redundant microprocessor system according to the invention.

Turning now to FIG. 3, more detail is illustrated of a redundant microprocessor control system according to the invention. As shown, a pair of processors A and B each receive inputs that may be generated, for example, by various types of sensors. In a ABS system, the inputs would be generated by wheel sensors. Processors A and B typically are programmed to process the input data using pre-programmed algorithms and to generate output data (i.e., data output signals) on data buses 12 and 14. Since both processors are running the same program, they should generate identical output data on buses 12 and 14 when both processors are operating properly.

Preferably, output data from the processor A is coupled to an error detector 16, and output data from the processor B is coupled to another error detector 18, whereby each error detector can detect errors in the output data from its associated processor. The error detectors 16 and 18 may also look for other errors developed by the processors A and B, and, for this purpose, the error detectors may sense, via leads 13 and 15, other signals generated by the processors. For example, the leads 13 and 15 may couple the error detectors to address registers within the processors to check for illegal addresses, or the leads 13 and 15 may give access to signals within the processors to permit the error detectors to make parity checks, signature analysis checks on the instruction flow in the processors, checks for illegal instructions, and/or to implement any other error detection procedure which looks for the proper operation of a processor. When any such error is detected, an error detector generates an error signal on one of the output leads 20, 22.

The outputs from the error detectors 16 and 18 are coupled to a pair of key generators 24 and 26. These key generators are the devices that provide appropriate keys to indicate that their associated processors are operating properly. Preferably, each of the key generators develops a changing, multi-bit code of a certain sequence in the absence of an error signal from its associated error detector. When a key generator receives an error signal on lead 20 or 22, the sequence of bits generated by the key generator is disrupted, thereby changing the pattern of the key.

The outputs (keys) developed by generators 24 and 26 are coupled via leads 28 and 30 to a lock circuit 32. This lock circuit generates its own internal, changing, multi-bit code that has the same sequence as the multi-bit codes that are normally generated by key generators 24 and 26. The lock circuit 32 compares its own multi-bit sequence to the multi-bit sequences generated by the key generators 24 and 26. If the lock 32 finds a match between its own multi-bit code and the multi-bit codes received on leads 28 and 30, it recognizes that there is a very high probability that processors A and B are both operating properly. On the other hand, if the lock circuit 32 should find a mismatch between its own internally generated multi-bit code and the multi-bit code received via the lead 28, for example, the lock circuit 32 would recognize that the code sequence generated by the key generator 24 had been disrupted by an error signal from the error detector 16. Consequently, the data output from the processor A would likely have an error, in which case the lock circuit would prohibit the data from the processor A from being used.

The output from the lock circuit is coupled via a lead 34 to a select circuit 36, the function of which is to receive the data outputs from processors A and B and to select one of them for coupling to an output data port 38. If the lock circuit 32 has found a mismatch between its own multi-bit code and the code received via lead 28, the lock circuit 32 sends a signal to the select circuit via lead 34 to inhibit the data from processor A from being coupled to the output data port 38. On the other hand, a match between the code developed by the lock circuit 32 and the code supplied by the key generator 26 indicates that the processor B is operating normally. Consequently, the lock circuit 32 outputs a signal which causes the select circuit 36 to couple data from the processor B to the output port 38. The data appearing at the output port 38 may form the input to a register or may be utilized in any other way.

It will be noted that the foregoing discussion was based on the assumption that both key generators 24 and 26 provided their output code (i.e. their keys) to a single lock circuit 32. Alternately, each key generator may have its own lock circuit. For example, the key generator 24 may have its output coupled to the lock circuit 32, while the key generator 26 may have its output coupled to another lock circuit 40 (shown in dashed lines), the output of the latter device being coupled to the select circuit 36. In this arrangement, the key generator 24 and the lock circuit 32 will normally generate the identical multi-bit sequence of bits, while the key generator 26 and lock 40 will also generate identical sequences of bits; but the sequences associated with the key generator 26 and the lock 40 do not need to be identical to the sequences generated by the key generator 24 and the lock 32. In all other respects, the operation of the system using two lock circuits is the same as the operation of the system using a single lock circuit.

Figure 4:
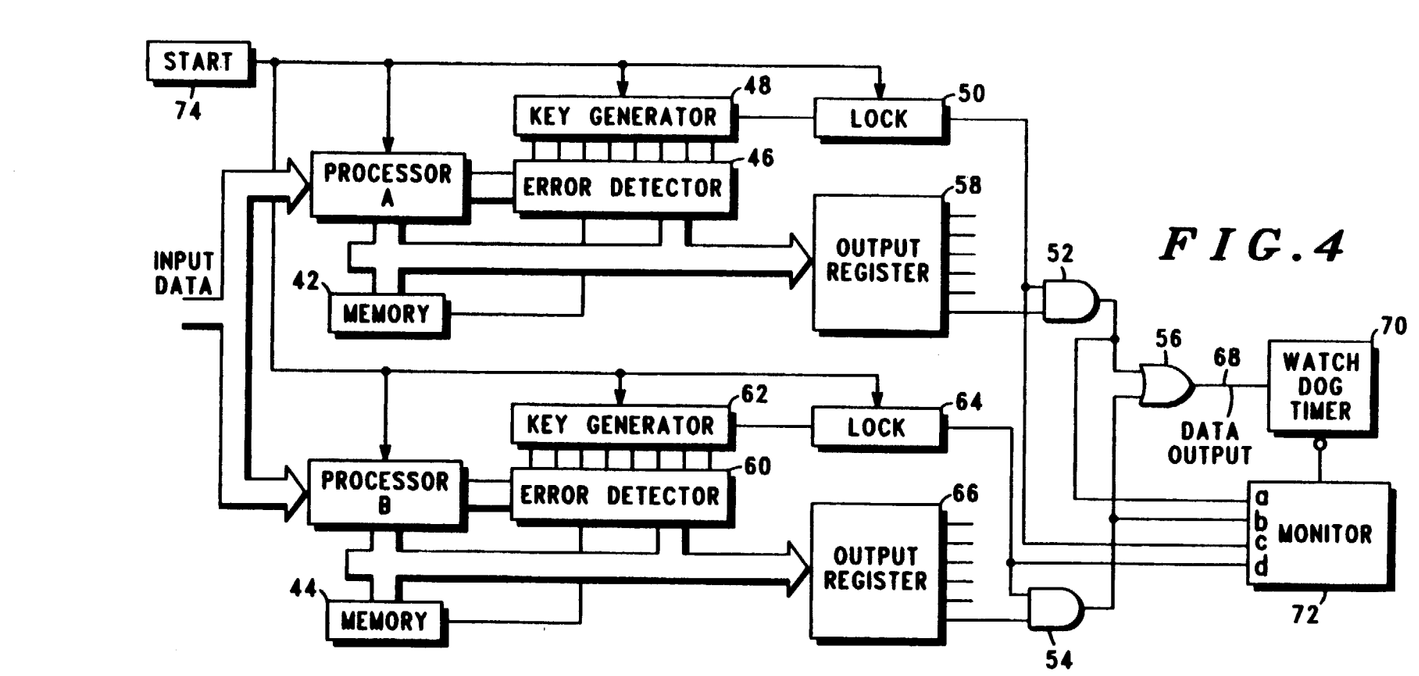
FIG. 4 is a more detailed diagram of a redundant system according to the invention.

Turning now to FIG. 4, the illustrated redundant control system is a synchronous system as will be discussed later, and it includes some output hardware that was not previously discussed. As before, the illustrated system includes two processors A and B, each shown with their conventional ROM or RAM memories 42 and 44. Also as before, the data output from processor A, and/or any other signals from the processor A that need to be checked for errors, are coupled to an error detector 46. The output of the error detector 46 is coupled to a key generator 48. The output of the key generator 48 is coupled to a lock circuit 50. The error detector, the key generator and the lock circuit all operate as previously described. The lock circuit 50 applies its output to a logic circuit comprising AND gates 52 and 54 and an OR gate 56. The data output from processor A is coupled to an output register 58 which supplies data to the AND gate 52.

The circuitry associated with processor B is similar in that it also includes an error detector 60, a key generator 62, a lock circuit 64 and an output register 66. The output from the register 66 is coupled to one input of the AND gate 54 which also receives the output from the lock circuit 64. With this arrangement, AND gates 52 and 54 will output data from output registers 58 and 66 only in the case where the lock circuits 50 and 64 develop high outputs indicative of a match between their internally generated bit codes and the bit codes supplied by key generators 48 and 62.

The outputs from AND gates 52 and 54 are coupled to the gate 56 whose output constitutes a data output selected from one of the registers 58 or 66. That data output, appearing on lead 68, is coupled to a conventional watchdog timer 70. The timer 70 is conventionally adapted to shut down the controller, or to shut off power to the logic circuit, upon failing to receive data on the lead 68 for a predetermined time interval. With this configuration, either of the processor A or B can keep the watchdog timer from timing out by supplying output data that has been determined to be correct, thereby permitting the system to continue to run with only one good processor.

Also shown is a monitor circuit 72 having inputs a, b, c, and d. Input a receives the output of the AND gate 52; input b receives the output from the AND gate 54; input c receives the output from the lock circuit 50; and input d receives the output from lock circuit 64. The output from the monitor is coupled to the watchdog timer 70 so that when the monitor senses a fault condition (described below), the watchdog timer will immediately shut down the system.

Figure 5:
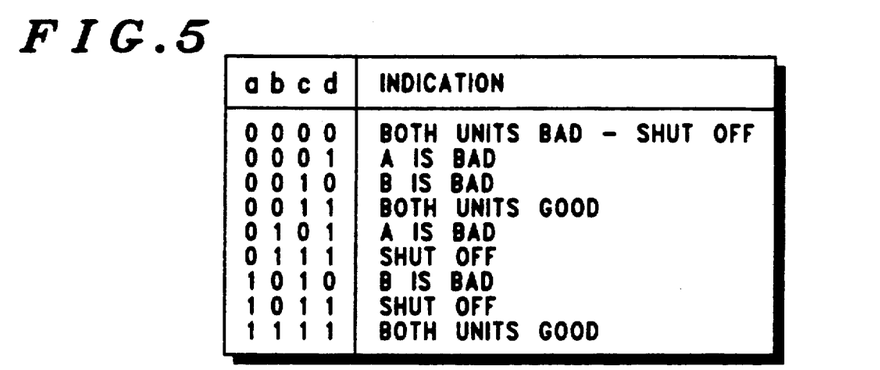
FIG. 5 is a truth table for the monitor shown in FIG. 4.

The monitor circuit 72, made of conventional logic gates, is essentially a logic circuit having a truth table as shown in FIG. 5. As indicated by the truth table, the monitor circuit not only identifies which of the processors is generating an erroneous output, it also identifies conditions where both processors and their key/lock circuitry have produced matching keys but the outputs from the processors A and B nevertheless differ. For example, when the inputs to the monitor circuit 72 are 0111, the lock circuits 50 and 64 have both developed an output indicative of a properly operating processor. However, the "1" applied to the monitor's b input and the "0" applied to the monitor's a input indicate that the data from output registers 58 and 66 is different, thereby indicating a fault condition in which the faulty processor cannot be identified. Consequently the monitor 72 operates the watchdog timer 70 to shut the system down. The same situation occurs when the inputs to the monitor are 1011. Other combinations of a, b, c and d that are not shown in the truth table indicate a failure in a lock circuit or in one of the AND gates 52, 54.

As will be appreciated, the inclusion of the monitor 72 is optional and not a required element of the basic lock and key system, but it nevertheless adds an additional safety factor that may be desirable in some applications.

As stated previously, the control system shown in FIG. 4 is synchronous. This means that the processor A, its key generator 48, and its lock circuit 50 are all started and run in synchronism with each other and with processor B, its key generator 62, and its lock circuit 64. This is accomplished by use of a start circuit 74 whose output (a start pulse) is coupled, as indicated, to all of the above mentioned elements. This ensures that the key generators and their corresponding lock circuits operate in synchronism so as to generate the identical multi-bit code sequences.

Figure 6:
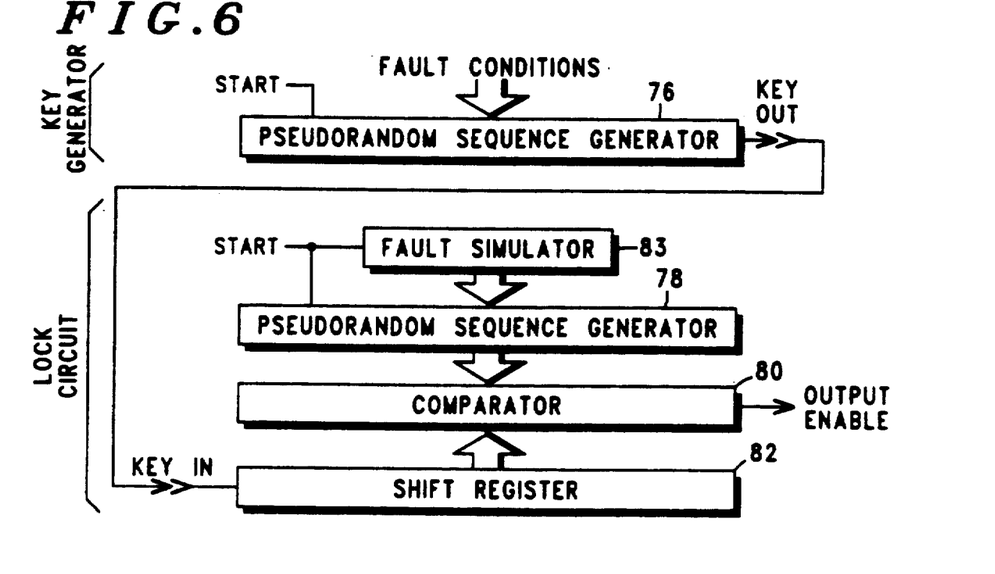
FIG. 6 is a block diagram of an illustrative key generator and lock circuit for use in the embodiment shown in FIG. 4.

Turning now to FIG. 6, there is shown a diagram of a typical key generator and lock circuit that may be used for the key generators 48 and 62 and the lock circuits 50 and 64. The illustrated key generator preferably includes a conventional pseudorandom sequence generator 76 that responds to a start input for developing a long string of ones and zeros of a certain sequence, which sequence constitutes the output key from the key generator. In the event that a fault condition is sensed by an error detector, that condition will be applied as an input (labelled "fault conditions") to the sequence generator 76 to thereby disrupt the certain sequence of ones and zeros that is otherwise generated.

The illustrated lock circuit includes an identical pseudo random sequence generator 78 that develops a long string of ones and zeros in the same certain sequence as that developed by the generator 76. That sequence is coupled to the input of a comparator 80, while the output from the sequence generator 76 is coupled to the input of a shift register 82. If the comparator finds a match between the contents of the shift register 82 and the output sequence generator 78, it develops an "output enable" signal which permits the associated processor's data output to be utilized.

The illustrated lock circuit preferably includes a fault simulator 83 that is included to ensure that the error detectors are working properly. At the beginning of a process, the error detectors are exercised to simulate a variety of fault conditions, and those conditions cause the sequence generator 76 to issue non-normal sequences of ones and zeros. The fault simulator 83 causes the same sequence of ones and zeros to be generated. If the system is operating normally, the comparator 80 will find a match between the code sequence output by the key generator and the code sequence developed by the lock circuit.

Figure 7:
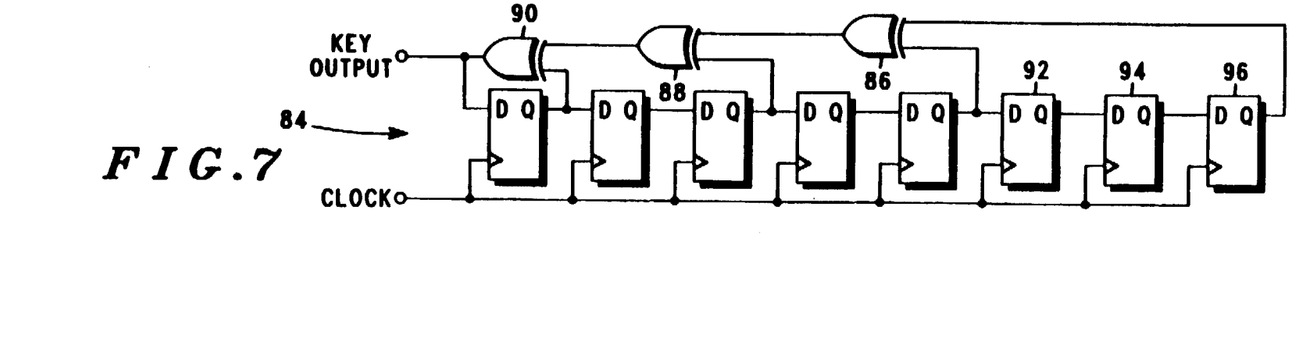
FIG. 7 is a more detailed schematic diagram of a key generator for use in the embodiment shown in FIG. 4.

Turning now to FIG. 7, a pseudorandom sequence generator 84 is shown which may be used to implement the sequence generators 76 and 78 shown in FIG. 6. This type of sequence generator can develop a very long sequence of bits, equal to one less than two to the nth power, where n is the number of stages in the sequence generator. In the illustrated embodiment, eight stages of flip-flops are interconnected with three exclusive OR gates 86, 88, and 90, as illustrated. With this arrangement, the pseudo random sequence generator 84 is capable of providing an output sequence of 255 bits. Longer sequences can be made by adding more stages.

Figure 8:
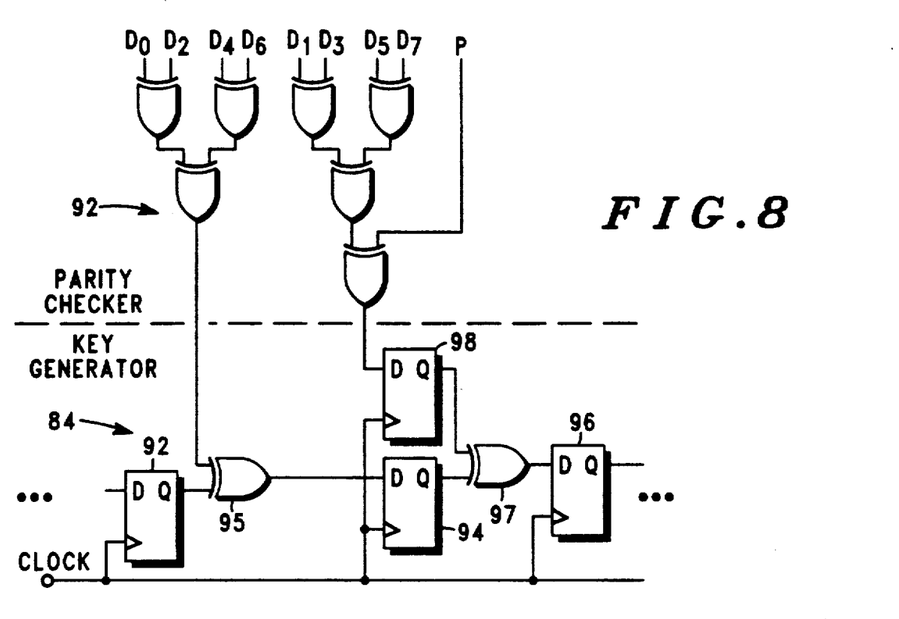
FIG. 8 is a schematic diagram of an illustrative error detector (shown in the form of a conventional parity checker), also showing a portion of the key generator of FIG. 7 and an interface circuit for coupling the error detector to the key generator.

The last three stages of the sequence generator 84 have been given reference numerals 92, 94, and 96 in order to illustrate their correspondence to the same stages that are illustrated in FIG. 8, to which reference is now made.

FIG. 8 shows a conventional error detector in the form of a parity checker 92 which may be used as one of the error detectors 46, 60 in FIG. 4. Of course, other forms or additional forms of error detectors may also be used. The illustrated parity checker 92 is a standard XOR (exclusive OR gate) tree modified to be self-checking. Any parity error or error in the parity checker itself will cause the sequence being generated to be modified. The output of the parity circuit will be either a 11 or a 00 when parity is correct. Errors are indicated by a 10 or a 01 pattern.

FIG. 8 also shows the way in which the parity checker 92 may interface with the random sequence generator 84 in order to alter its sequence of output bits in response to detecting an error. As the parity checker 92 is entirely conventional, its details will not be discussed further except to briefly discuss the interface between the parity checker and the key generator.

As shown, an exclusive OR gate 95 is situated between the flip-flop stages 92 and 94 of the key generator, one input of the exclusive OR gate 95 being coupled to the Q output of stage 92 and the other input being received from an exclusive OR gate in the parity checker 92. Another exclusive OR gate 97 is situated between stages 94 and 96, one input thereto coming from the stage 94 and the other input coming from an additional D type flip-flop 98 whose data input is coupled to one of the outputs from the parity checker. All the other stages of the key generator that are not shown in FIG. 8 are configured the same as is shown in FIG. 7.

Figure 9:
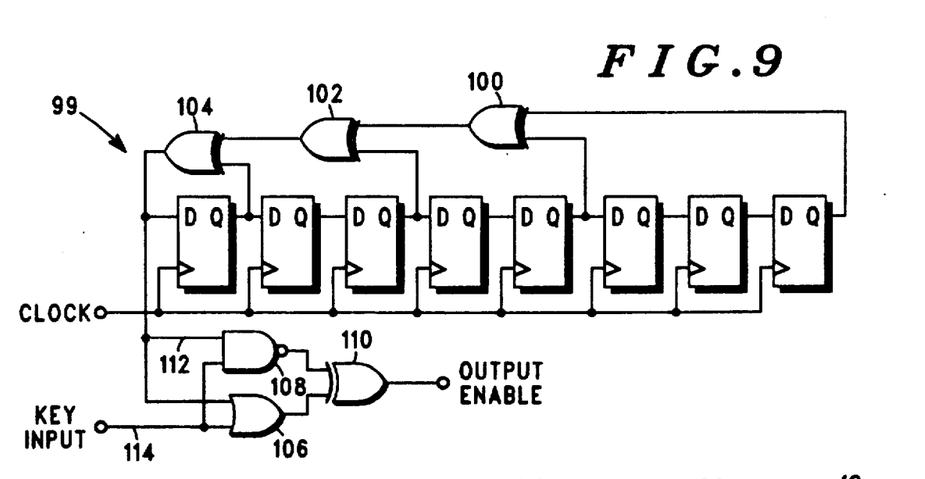
FIG. 9 is a more detailed schematic diagram of a portion of a lock circuit for use in the embodiment shown in FIG. 4.

Referring to FIG. 9, a lock circuit 99 is shown which may be used for the lock circuits 50 and 64 in FIG. 4. This illustrative lock circuit 99 includes 8 stages of D type flip-flops interconnected, as shown, with each other and with three exclusive OR gates 100, 102 and 104. A common clock signal is supplied to each of the flip-flops in the indicated manner, and a multi-bit output sequence of ones and zeros is developed on a lead 112 for comparison with another string of ones and zeros received on a lead 114 (key in) from one of the key generators. The comparison of the reference key generated by the lock circuit 99 and the key provided from the key generator is accomplished by a NAND gate 108 and an OR gate 106. These two gates provide a coded output which is further decoded by an exclusive OR gate 110 to provide a non-coded output identified as "output enable". This "output enable" will either prohibit or permit the data from a lock circuit's associated processor from being utilized.

As previously discussed, an effective self test of the system requires that the lock circuits be capable of simulating the same faults that are being crated in the key generators or processors. A block diagram of a lock circuit having its own fault simulator to accomplish this purpose was described with reference to FIG. 6. A programmable fault simulator that may be used in the arrangement shown in FIG. 6 will now be described with reference to FIG. 10.

Figure 10:
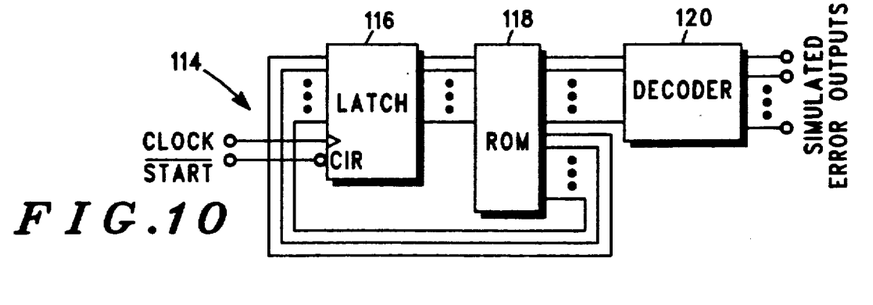
FIG. 10 is a schematic diagram of a fault simulator for use with the lock circuit shown in FIG. 6.

The illustrated fault simulator 114 includes three conventional components: a latch 116, a ROM 118, and a decoder 120. In this arrangement, the ROM is used as a simple state machine that is programmed to match the characteristics of the self test in the processor and error detectors. Stated differently, the ROM 118 is programmed to output sequences of ones and zeros that correspond tot he sequences of ones and zeros that are output by an associated error detector during self test.

The outputs of the ROM 118 are divided into two groups; one group is decoded by the decoder 120 to provide simulated error output signals to the sequence generator 78 in the lock circuit shown in FIG. 6. (These error output signals may be coupled into the sequence generator 78 in the same manner as the outputs of the parity checker 92 (FIG. 8) are coupled into the key generator 84.); the other group is used to provide the next address to the ROM and is clocked into the latch 116. The latch is cleared to start the simulation sequence.

As shown in FIGS. 7-9, the key generators and lock circuits have clock inputs, and these clock inputs may be generated conventionally. It should be understood, however, that if a lock circuit and its associated key generator run off the same clock, a failure of that common clock could result in an invalid "output enable" signal (see FIG. 6). To prevent this, the clock signals for the lock circuit and its associated key generator may be generated independently of each other. The two clocks would need to be synchronized with each other, but the failure of one clock should not cause a failure of the other clock.

Figure 11:
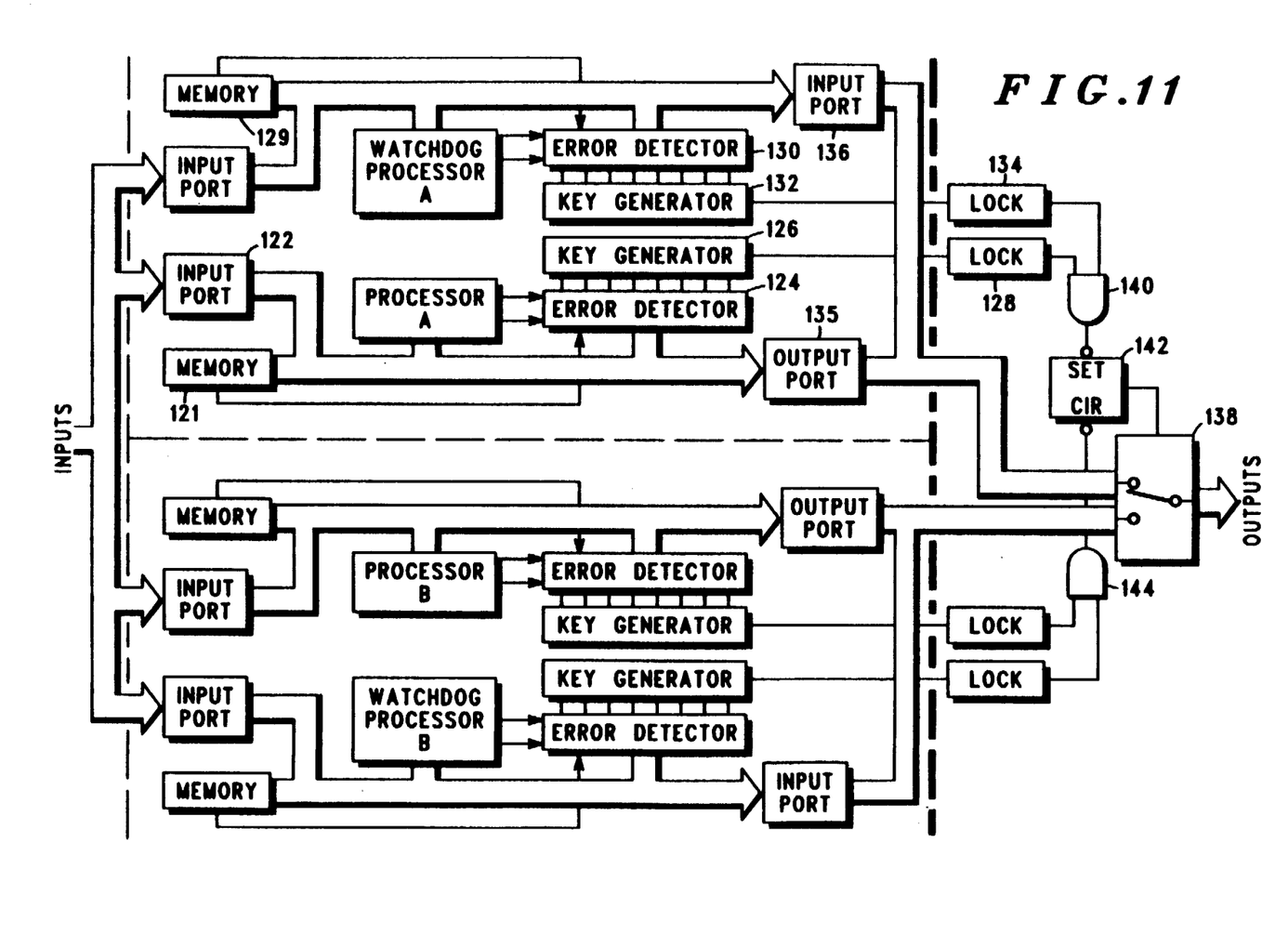
FIG. 11 is a block diagram of another embodiment of the invention, in this case an a synchronous redundant control system.

Referring now to FIG. 11, an a synchronous system is shown. This system also illustrates how a watchdog processor may be included in the system.

The illustrated system includes two separate sub-systems, each one having its own processor, watchdog processor, and associated key generators and lock circuits. One sub-system includes a processor A, while the other sub-system includes a processor B. As the two sub-systems are identical, only the sub-system that includes processor A will be described. As shown, the processor A, having a memory 121, receives inputs signals (as from sensors) via an input port 122. Associated with the processor A are an error detector 124, a key generator 126, and a lock circuit 128, all of which operate as described previously.

In the sub-system with processor A is a conventional watchdog processor A having its own memory 129 plus its own associated error detector 130, key generator 132, and lock circuit 134. The function of the watchdog processor A is to check on the actions of the processor A to determine whether its outputs are reasonable, thereby to detect, for example, possible design errors in the hardware or software. AS the operation of such watchdog processors is conventional, it will not be described in more detail.

The data output of the processor A is coupled through an output port 135 to two locations: back to the watchdog processor A via an input port 136, and to a conventional switch 138 which will be enabled to output data from a processor that has been confirmed to be operating properly.

As shown, the outputs from lock circuits 128 and 134 are coupled to the inputs of an AND gate 140. Accordingly, the output of the AND gate 140 goes high only when the lock circuits 128 and 134 have confirmed that the processor A and the watchdog processor A are operating properly.

The output of the AND gate 140 is coupled to the "set" input of a set/resent flip-flop 142. The "CLR" input of the flip-flop is coupled to the output of another AND gate 144 which develops a high output when processor B and watchdog processor B are both operating properly. The output of the flip-flip 142 is coupled to the switch 138 so as to cause the switch 138 to output data from a processor which has been determined to be operating properly (i.e., all keys fit all locks).

From the foregoing discussions, one can appreciate that the lock and key arrangement permits the system to be re-configured safely because the re-configuration is controlled by a lock circuit that cannot enable a processor's output unless the processor provides a valid key. This makes it highly unlikely that the output of a defective processor will be used, particularly since the locks are multi-bit sequences that change in response to error conditions.

Although the invention has been described in terms of a preferred embodiment, it will be obvious to those skilled in the art that many alterations and variations may be made without departing from the invention. For example, the functions of the key generators, the error detectors, and/or the lock circuits may be implemented in software, or by a combination of software and hardware. Many other variations will also be obvious to those skilled in the art. Accordingly, it is intended that all such alternations and variations be considered as within the spirit and scope of the invention as defined by the appended claims.

What is claimed is:

1. A redundant processing system, comprising:
   at least two processors for generating a plurality of signals, including output data signals;
   at least two error detectors, each error detector being associated with a different one of the processors, each error detector receiving at least one of the signals generated by its associated processor for detecting errors in the received signal, and for generating an error signal when an error is detected;
   at least two key generators, each key generator being associated with a different one of the error detectors, and each key generator developing a changing, multi-bit code of a certain sequence in the absence of an error signal received from its associated error detector, and wherein said sequence is disrupted in the presence of an error signal;
   at least one lock circuit receiving the multi-bit codes from the key generators, developing a corresponding changing multi-bit code of the same certain sequence, and comparing its own code to the codes received from the key generators, and generating an output signal for identifying a processor having a signal in which an error has been detected when a mismatch occurs between a key generator's code and the lock circuit's code;
   a data output port;
   a logic circuit, coupled between the lock circuit and the data output port, receiving the output data signals from the processors, and responsive to the output signal from the lock circuit, for excluding, from the output port, an output data signal generated by a processor that is identified as having a signal with a detected error, and for coupling to the output port the output data signal generated by a processor that is not identified as having a signal with a detected error; and
   a watchdog timer coupled to the logic circuit for disabling the control system when an output data signal fails to appear at the output port for a predetermined time period.

2. A redundant processing system, comprising:
   at least two processors for generating a plurality of signals, including output data signals;
   at least two error detectors, each error detector being associated with a different one of the processors, each error detector receiving at least one of the signals generated by its associated processor for detecting errors in the received signal, and for generating an error signal when an error is detected;
   at least two key generators, each key generator being associated with a different one of the error detectors, and each key generator developing a changing multi-bit code of a certain sequence in the absence of an error signal received from its associated error detector, and wherein said sequence is disrupted in the presence of an error signal;
   at least one lock circuit receiving the multi-bit codes from the key generators, developing a corresponding changing multi-bit code of the same certain sequence, and comparing its own code to the codes received from the key generators, and generating an output signal for identifying a processor having a signal in which an error has been detected when a mismatch occurs between a key generator's code and the lock circuit's code;
   a data output port;
   a logic circuit, coupled between the lock circuit and the data output port, receiving the output data signals from the processors and responsive to the output signal from the lock circuit, for excluding, from the output port, an output data signal generated by a processor that is identified as having a signal with a detected error, and for coupling to the output port the output data signal generated by a processor that is not identified as having a signal with a detected error, and wherein the logic circuit also identifies differences between the data output signal of one processor and the data output signal of the other processor; and
   a monitor circuit coupled to the logic circuit and to the lock circuit for generating a shut-down signal in response to the output of the lock circuit being indicative of no errors in the processors' signals while the logic circuit indicates a difference between the processors' output data signals.

3. A redundant processing system, comprising:
   a first processor receiving input data and generating a plurality of signals, including an output data signal;
   a second processor receiving the same input data and generating a plurality of signals, including an output data signal which corresponds to the output data signal from the first processor when both processors are operating without errors;
   a first error detector receiving at least one signal generated by the first processor for detecting errors in the received signal and for generating an error signal when an error is detected;
   a second error detector receiving at least one signal generated by the second processor for detecting errors in the received signal and for generating an error signal when an error is detected;
   a first key generator coupled to the first error detector for generating a first multi-bit code of a certain sequence and for disrupting the certain sequence in response to an error signal received from the first error detector;
   a second key generator coupled to the second error detector for generating a second multi-bit code of a certain sequence and for disrupting the certain sequence in response to an error signal received from the second error detector;
   a first lock circuit generating a multi-bit code of the same certain sequence as the code from the first key generator, for comparing its own code against the code generated by the first key generator, and for indicating the presence of an error when a mismatch occurs as a result of such comparison;
   a second lock circuit generating a multi-bit code of the same certain sequence as the code from the second key generator, for comparing its own code against he code generated by the second key generator, and for indicating the presence of an error when a mismatch occurs as a result of such comparison;
   means receiving the output data signals from the first and second processors and responsive to the indications from the first and second lock circuits, for selecting a data output signal from a processor that has not been identified as having an error in any of its signals; and a watchdog system associated with each processor, each watchdog system including:

a watchdog processor for checking the output of its associated processor and for generating an output;

an error detector for sensing errors in the output of the watchdog processor;

a key generator coupled to the error detector; and a lock circuit coupled to the key generator.

* * * * *